United States Patent

Acker

Patent Number: 5,941,564
Date of Patent: Aug. 24, 1999

[54] GAS BAG

[75] Inventor: Dominique Acker, Alfdorf, Germany

[73] Assignee: TRW Occupant Restraint Systems GmbH, Alfdorf, Germany

[21] Appl. No.: 08/824,229

[22] Filed: Mar. 25, 1997

[30] Foreign Application Priority Data

Mar. 29, 1996 [DE] Germany .................. 296 05 897 U

[51] Int. Cl.⁶ .................................................. B60R 21/16
[52] U.S. Cl. ................................. 280/743.2; 280/733
[58] Field of Search ...................... 280/748, 749, 280/753, 732, 733, 742, 730.1, 728.1, 728.2, 730.2, 743.1, 743.2; 442/183; 428/35.2

[56] References Cited

U.S. PATENT DOCUMENTS

| 3,888,503 | 6/1975 | Hamilton . | |
|---|---|---|---|
| 5,322,322 | 6/1994 | Bark et al. . | |
| 5,607,183 | 3/1997 | Nishimura | 280/743.2 |
| 5,618,595 | 4/1997 | Matsushima | 280/743.2 |
| 5,642,905 | 7/1997 | Honda | 280/743.2 |

FOREIGN PATENT DOCUMENTS

| 4307175 | 9/1993 | Germany . |
|---|---|---|
| 19519297 | 12/1995 | Germany . |
| 4436139 | 3/1996 | Germany . |
| 4832005 | 10/1973 | Japan . |
| 5037131 | 4/1975 | Japan . |
| 5208653 | 8/1993 | Japan . |
| 7501023 | 2/1994 | Japan . |
| 7506789 | 2/1994 | Japan . |
| 664493 | 3/1994 | Japan . |
| 826063 | 1/1996 | Japan . |
| 5147310 | 11/1996 | Japan . |

*Primary Examiner*—Robert J. Oberleitner
*Assistant Examiner*—C. T. Bartz
*Attorney, Agent, or Firm*—Tarolli, Sundheim, Covell, Tummino & Szabo

[57] ABSTRACT

A gas bag for a vehicle has an substantially elongated shape and is convertable from a folded-up condition to an inflated condition. The vehicle has securing sites between which the bas bag is installed bow-shaped. The gas bag has an outer wall, two opposed longitudial ends and at least one element, the element constricting the gas bag in its inflated condition substantially transversely to the longitudinal direction of the gas bag so that the gas bag is shortened in the longitudinal direction and bridges the securing sites by the shortest way.

15 Claims, 3 Drawing Sheets

GAS BAG

TECHNICAL FIELD

The invention relates to a gas bag for vehicle occupants.

BACKGROUND OF THE INVENTION

A gas bag which defines a part of a side-impact protection means is known from U.S. Pat. No. 5,322,322. This head gas bag is configured hose-shaped and secured by its side ends to the A-pillar and to the B-pillar. In the folded-up condition, the gas bag extends under a covering along the A-pillar over the roof frame up to the B-pillar so that it is incorporated in the vehicle substantially bow-shaped. The gas bag comprises a special fabric which, on inflation of the gas bag, produces a substantial shortening in length of the same. On deployment the gas bag opens the covering and extends more or less linearly from one securing end to the opposite one.

On impact of the head of a vehicle occupant, the known gas bag is not supported by the side window, which is usually destroyed in any case due to side impact, it instead being tensioned between its side ends.

However, the special fabric makes the known gas bag relatively expensive. In addition to this, with this fabric only a limited shortening of the gas bag in the longitudinal direction can be achieved on inflation.

BRIEF SUMMARY OF THE INVENTION

The invention provides a cost-effective gas bag of simple configuration which on inflation substantially shortens in its longitudinal direction.

The gas bag according to the invention which is for installation in a vehicle has an substantially elongated shape and is convertable from a folded-up condition to an inflated condition. The vehicle has securing sites between which the bas bag is installed bow-shaped. The gas bag has an outer wall, two opposed longitudial ends and at least one element, the element constricting the gas bag in its inflated condition substantially transversely to the longitudinal direction of the gas bag so that the gas bag is shortened in the longitudinal direction and bridges the securing sites by the shortest way. Due to the constricting element, the wall of the gas bag in the inflated condition bulges more or less strongly so that the overall length of the previously bowed-installed gas bag is reduced and the latter is tensioned linearly between the securing points, particularly when employing several constricting elements.

The constricting element may be e.g. a separate fabric part which is secured to the gas bag or a specially woven wall section.

In accordance with one preferred embodiment, the gas bag has a hose-type configuration, it being particularly advantageous when the constricting element surrounds the gas bag ring-shaped. Since the constricting element is intended not to restrict the flow cross-section in the interior of the gas bag to such an extent that as a result the time needed to inflate a gas bag is greatly increased, the constricting element reduces the diameter of the hose-type gas bag preferably to about one third.

It is, in addition to this, also possible to use a gas bag fabric, the weave of which is oriented at 45° to the longitudinal extension of the gas bag. Such a gas bag fabric results in a shortening of the gas bag in the longitudinal direction on inflation. Due to the combination of a gas bag fabric configured as such and constricting elements particularly strong shortenings of the gas bag can be achieved.

The gas bag according to the invention is applicable in a side-impact protection means, it being secured by its opposite side ends to the roof frame and the A-pillar of a vehicle and in its folded-up condition is oriented under a covering along the roof frame and the A-pillar.

The gas bag according to the invention is also applicable as a knee protection means, however, in which it forms a tensile belt having a restraining function for the vehicle occupant in the region of his knees. In this arrangement, the gas bag is preferably secured in the footwell of the vehicle.

BRIEF DESCRIPTION OF PREFERRED EMBODIMENTS

Figure 1:
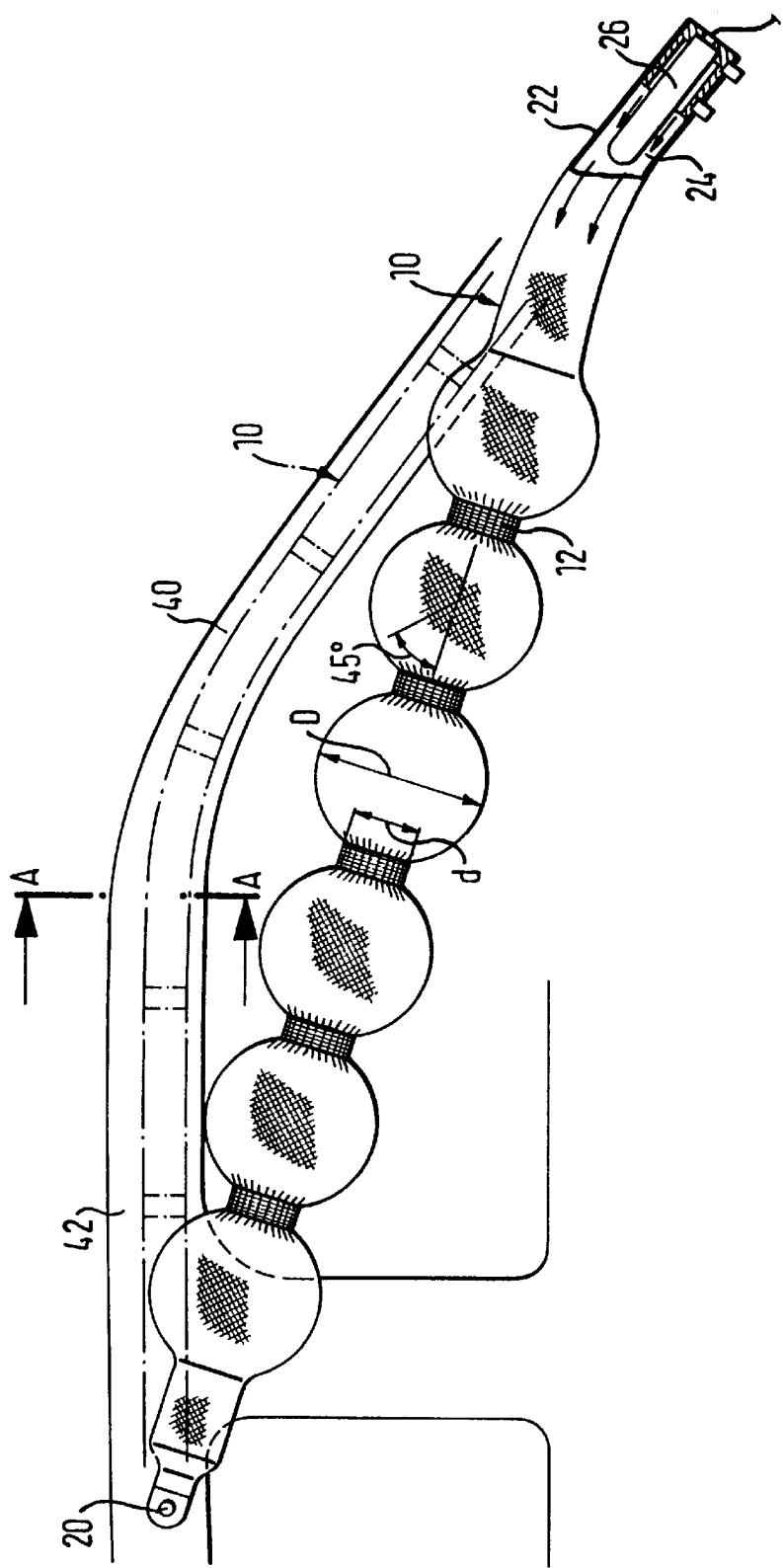
FIG. 1 is a schematic side view of a first embodiment of the gas bag according to the invention in inflated condition as part of a side-impact protection means.

In FIG. 1, a side-impact protection means is shown including a gas generator 26 and a hose-type gas bag 10. The gas bag 10 is secured by its side ends to the lower end of the A-pillar 40, on the one hand, and, on the other, to the roof frame 42 in the region of the B-pillar of a vehicle. Suitable securing sites are denoted by 22 and 20 respectively. Also connected to the A-pillar 40 is the gas generator 26 which protrudes through a gas orifice 24 in the gas bag 10 into the interior thereof.

Figure 2:
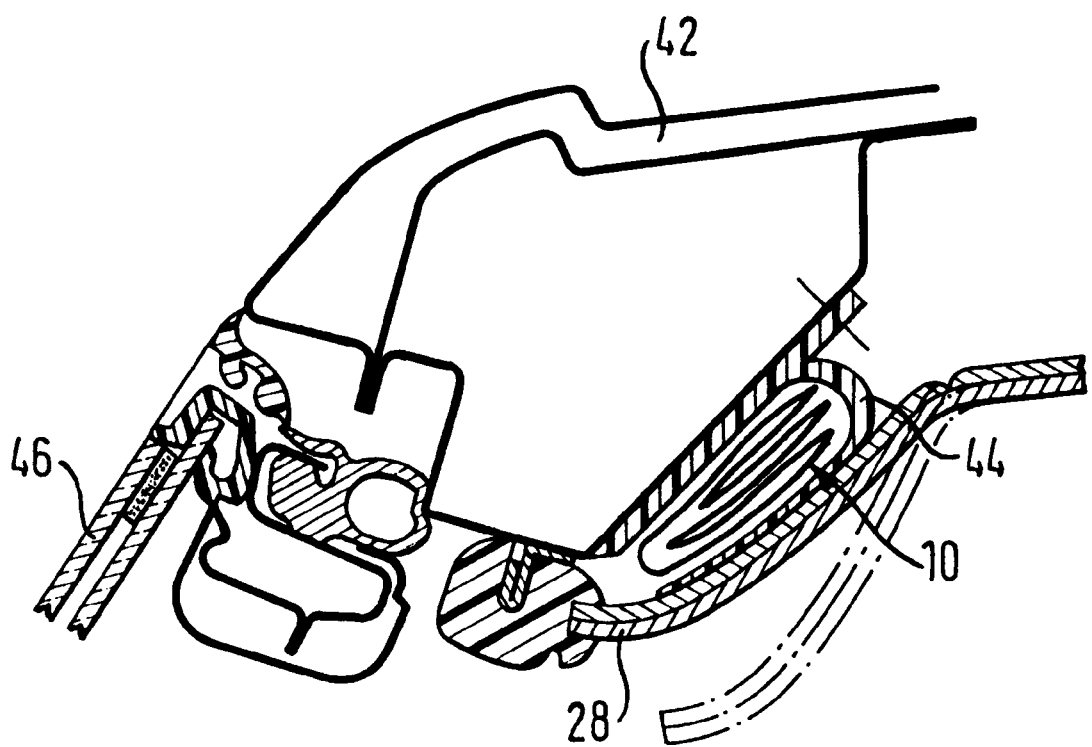
FIG. 2 is a section along the line A—A according to FIG. 1 through a roof frame with the gas bag folded-up.

In its non-inflated condition, the gas bag 10 is concealed under a trim 28 as is evident from FIG. 2, the gas bag thereby extending from the securing site 22 along the A-pillar 40 and the roof frame 42, as indicated by the dot-dashed lines in FIG. 1, up to securing site 20 behind the B-pillar.

Locating the folded-up gas bag 10 behind the trim 28 is done by a plastics sleeve 44 having an open longitudinal end pointing to a side window 46. The gas bag 10 comprises several constrictions at regular intervals which are caused by elements 12 surrounding the gas bag 10 ring-shaped. The elements 12 consist of fabric tape having a possible low expansion, said tape being secured to the wall of the gas bag 10. In addition to this, the elements 12 may also be of plastics or woven into the gas bag wall. It is, furthermore, possible that a wall section 10 in the portion of the elements 12 is specially woven so that, in the inflated condition, it is able to take up in this portion not all of the gas bag diameter D but a reduced diameter d which is about one third as large as the maximum diameter D in the non-constricted portion.

The direction of weave of the wall consisting of a textile fabric is oriented at 45° to the longitudinal direction of the gas bag 10 and thus promotes on inflation a shortening of the gas bag 10 in the longitudinal direction together with the elements 12.

In case of a side impact, gas generated by the gas generator 26 flows into the interior of the gas bag 10. The gas bag 10 shortens longitudinally so that it bridges the securing sites 20, 22 by the shortest possible way, globular or cylindrical sections then materializing between the individual elements 12, depending on the spacing of the elements 12.

The elements 12 need not be arranged regularly spaced, instead they should be adapted to the securing sites 20, 22 and the generator mount as well as to the seat position relative to the location of the gas bag. Differing elements 12 may also be used which constrict the gas bag 10 differingly at the various points, whereby in the region of the head of a vehicle occupant a less stronger constriction is of advantage whilst e.g. stronger constrictions may be provided at the securing points 20, 22. The gas bag 10 shown in FIG. 1 does not require the side window for support since it is tensioned in the longitudinal direction between the securing sites 20 and 22.

Figure 3:
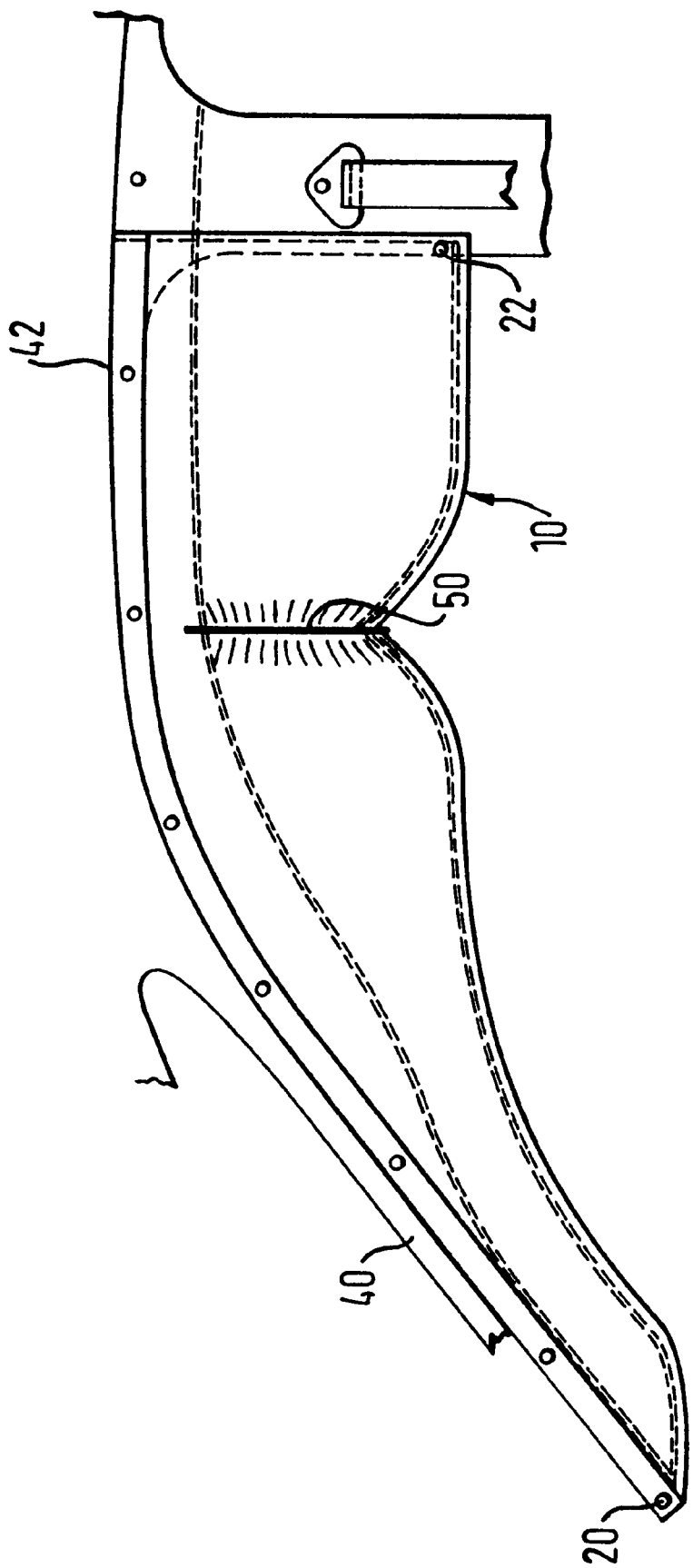
FIG. 3 shows a second embodiment of the gas bag according to the invention which is configured cushion-shaped.

In the embodiment shown in FIG. 3, the gas bag 10 is configured not hose-like but cushion-shaped. It extends in its inflated condition from the lower end of the A-pillar 40 up to the B-pillar and in the non-inflated condition is concealed under a cover 28, it accordingly also being incorporated in the vehicle bow-shaped. Contrary to the embodiment shown in FIG. 1, however, more than two securing sites 20, 22 are provided. On deployment of the gas bag 10 it shortens mainly in the portion of its lower edge so strongly due to a cord defining the constricting element 50 and being woven into the gas bag wall that the gas bag 10, bursts the covering 28 from its attachment and bridges the outermost securing sites 20, 22 by shortest way. A further difference between the embodiment shown in FIGS. 1 and 2 and that shown in FIG. 3 consists of the constricting element 50 not surrounding the cushion-shaped gas bag 10 according to FIG. 3 ring-shaped, it instead merely constricting the lower edge portion thereof.

Common to both embodiments is that the constricting elements 12, 50 extend subtantially transversely to the longitudinal direction of the gas bag 10.

Alternatively, the elements 12, 50 may also be configured as tapes or cords secured to the roof frame 42 which constrict the lower edge portion of the gas bag 10. This embodiment is more complicated to install, however.

I claim:

1. A gas bag for a vehicle, said gas bag having a substantially elongated shape and being convertible from a folded-up condition to an inflated condition, said vehicle having securing sites between which said gas bag is installed bow-shaped, said gas bag including an outer wall, two opposed longitudinal ends and at least one element, said element constricting said gas bag in its inflated condition substantially transversely to the longitudinal direction of said gas bag so that said gas bag is shortened in said longitudinal direction and bridges said securing sites by the shortest way, wherein said element constricts at least the lower edge portion of said gas bag in its inflated state so that the lower edge is curved.

2. The gas bag as set forth in claim 1, wherein said constricting element is configured in the form of a tape.

3. The gas bag as set forth in claim 1, wherein said constricting element is configured in the form of a cord.

4. The gas bag as set forth in claim 1, wherein said constricting element surrounds said gas bag in the shape of a ring.

5. The gas bag as set forth in claim 1, having a specially woven wall section which defines said constricting element.

6. The gas bag as set forth in claim 1, wherein said constricting element is woven into said gas bag wall.

7. The gas bag as set forth in claim 1, wherein said constricting element is secured to said wall of said gas bag.

8. The gas bag as set forth in claim 1, wherein said constricting element is made of plastics.

9. The gas bag as set forth in claim 1, wherein said constricting element is made of fabric material.

10. The gas bag as set forth in claim 1, wherein said gas bag is configured hose-like.

11. The gas bag as set forth in claim 10, wherein said constricting element reduces the diameter of said hose-like gas bag to about one third of an unconstricted diameter in the inflated condition.

12. The gas bag as set forth in claim 1, wherein said wall consists of a textile fabric, the direction of weave of which is oriented at 45° to said longitudinal direction of said gas bag.

13. The gas bag as set forth in claim 1 for connection with a gas generator, wherein a gas orifice is provided at one of said longitudinal ends of said gas bag for connecting said gas generator.

14. The gas bag as set forth in claim 1, wherein said gas bag is part of a side-impact protection means within said vehicle, said vehicle comprises an A-pillar, a roof frame and a cover along said roof frame, said gas bag being secured by its opposed longitudinal ends to said roof frame on the one hand and to said A-pillar on the other and oriented in the folded-up condition under said cover.

15. A gas bag for a vehicle, said gas bag comprising a substantially elongated shape and being convertible from a folded-up condition to an inflated condition, said vehicle having securing sites between which said gas bag is installed bow-shaped, said gas bag including an outer wall, two opposed longitudinal ends and at least one element, said element constricting said gas bag in its inflated condition substantially transversely to the longitudinal direction of said gas bag so that said gas bag is shortened in said longitudinal direction and bridges said securing sites by the shortest way, wherein said gas bag is part of a knee protection means within said vehicle, said vehicle having a footwell for each front occupant and said gas bag being secured in said vehicle and extends around said footwell in its folded-up state.

* * * * *